US012529496B2

(12) United States Patent
Bjørn et al.

(10) Patent No.: US 12,529,496 B2
(45) Date of Patent: Jan. 20, 2026

(54) DECENTRALIZED SYSTEM FOR COMBINED FRESH AIR VENTILATION AND RECIRCULATION WITH A HEAT PUMP HAVING A VIBRATION-DAMPENED COMPRESSOR (71) Applicant: Airmaster A/S, Aars (DK)

(72) Inventors: Erik Bjørn, Aars (DK); Steffen Pedersen, Aars (DK); Ole Valentin Sørensen, Aars (DK)

(73) Assignee: Airmaster A/S, Aars (DK)

( * ) Notice: Subject to any disclaimer, the term of this patent is extended or adjusted under 35 U.S.C. 154(b) by 213 days.

(21) Appl. No.: 18/250,053

(22) PCT Filed: Oct. 13, 2021

(86) PCT No.: PCT/EP2021/078332
§ 371 (c)(1),
(2) Date: Apr. 21, 2023

(87) PCT Pub. No.: WO2022/084122
PCT Pub. Date: Apr. 28, 2022

(65) Prior Publication Data
US 2024/0003591 A1 Jan. 4, 2024

(30) Foreign Application Priority Data
Oct. 23, 2020 (EP) .................................... 20203580

(51) Int. Cl.
*F24F 13/22* (2006.01)
(52) U.S. Cl.
CPC .................................. *F24F 13/222* (2013.01)

(58) Field of Classification Search
CPC .. F24F 12/006; F24F 12/003; F24F 2013/202; F24F 2012/007; F24F 13/222; Y02B 30/56; Y02B 30/52
See application file for complete search history.

(56) References Cited

U.S. PATENT DOCUMENTS 3,300,125 A * 1/1967 Winkler ................ F04B 39/127
417/363
4,982,812 A * 1/1991 Hwang ................... F24F 13/24
415/119
(Continued)

FOREIGN PATENT DOCUMENTS

CN 206572630 U 10/2017
CN 107339763 A 11/2017
(Continued)

OTHER PUBLICATIONS

Extended European Search Report; European Patent Office; European Application No. 20203580.4; Apr. 16, 2021; 8 pages.
(Continued)

*Primary Examiner* — Ana M Vazquez
(74) *Attorney, Agent, or Firm* — Taft Stettinius & Hollister LLP (57) ABSTRACT A decentralized system for providing an optimized environment in a room, the decentralized system includes a balanced ventilation system and a fluid system both arranged in a housing. The decentralized system includes a compressor which is suspended by three or more springs attached to the compressor at a horizontal plane at the compressor's center of gravity or less than 20% of the compressor's length above or below the compressor's center of gravity.

16 Claims, 8 Drawing Sheets (56) References Cited

U.S. PATENT DOCUMENTS

| | | | |
|---|---|---|---|
| 11,473,831 B2* | 10/2022 | Tsutsumi | F24F 13/222 |
| 2008/0250800 A1 | 10/2008 | Wetzel | |
| 2011/0308265 A1* | 12/2011 | Phannavong | F24F 11/84 |
| | | | 62/160 |
| 2014/0262132 A1* | 9/2014 | Connell | B60H 1/00321 |
| | | | 165/96 |

FOREIGN PATENT DOCUMENTS

| | | | |
|---|---|---|---|
| CN | 206959196 U | | 2/2018 |
| CN | 109631173 A | | 4/2019 |
| CN | 208832700 U | * | 5/2019 |
| CN | 210393713 U | * | 4/2020 |
| CN | 211667998 U | | 10/2020 |
| DE | 3027447 A1 | | 2/1982 |
| DE | 102006046630 A1 | | 4/2008 |
| GB | 2528642 A | | 2/2016 |
| KR | 20030021645 A | | 3/2003 |
| KR | 20030052290 A | | 6/2003 |

OTHER PUBLICATIONS

International Search Report; European Patent Office; International Application No. PCT/EP2021/078332; Dec. 8, 2021; 5 pages.
Written Opinion of the International Searching Authority; European Patent Office; International Application No. PCT/EP2021/078332; Dec. 8, 2021; 7 pages.
First Office Action; The State Intellectual Property Office of People's Republic of China; Chinese Patent Application No. 202180077434.X; May 22, 2025; 22 pages.

* cited by examiner

DECENTRALIZED SYSTEM FOR COMBINED FRESH AIR VENTILATION AND RECIRCULATION WITH A HEAT PUMP HAVING A VIBRATION-DAMPENED COMPRESSOR

CROSS-REFERENCE TO RELATED APPLICATIONS

This application is a U.S. National Phase of International PCT Application No. PCT/EP2021/078332 filed on Oct. 13, 2021, which claims priority to European Patent Application No. 20203580.4 filed on Oct. 23, 2020, each of which are incorporated herein by reference in their entirety.

FIELD OF THE INVENTION

The present invention relates to a decentralized system for ventilation and temperature control, which can be operated in a plurality of modes to obtain an optimized environment in a room. In particular, it relates to such a system comprising a vibration-dampened compressor.

BACKGROUND OF THE INVENTION

Climatic control of the indoor environment in buildings involves several disciplines, among these: Control of mass and energy balances to obtain comfortable surroundings, velocity distributions to avoid drafts and yet acquire sufficient mixing efficiency, noise reduction, and the ability to take different inputs to an efficient and coordinated action.

Modern building requirements for low energy consumption result in virtually airtight and very well-insulated buildings with low heating needs. However, such buildings will often experience high in-door temperatures during summer, which make it necessary to have mechanical ventilation with heat recovery and a fresh air bypass function. In many parts of the world, it is also necessary to have active cooling of some kind, most often in the form of air-air heat pumps. In colder parts of the world, low heat demands also make air-air heats pumps interesting, since it becomes viable to keep a comfortable temperature with a low temperature heat source, making heat pumps more efficient.

A familiar aspect of present day indoor climate control is therefore that of separate systems with contradicting control strategies, which can lead to inefficiency in the control strategies.

A solution to these problems is having a single apparatus according to GB2528642A. However, such systems produce significant vibrations and noise, which makes them impractical to place within the room to be ventilated.

Further, condensate removal of the components requires multiple pumps and will often result in additional vibrations, noise and potential leaks due to the added complexity. This further prohibits placing such a system within the room to be ventilated.

A more practical system for solving the above problems is therefore highly advantageous, such that a decentralized system can be placed within a room.

OBJECT OF THE INVENTION

An object of the present invention is to provide an alternative to the prior art. In particular, it may be seen as a further object of the present invention to provide a system that solves the above-mentioned problems of the prior art systems.

SUMMARY OF THE INVENTION

Thus, the above-described object and several other objects are intended to be obtained in a first aspect of the invention by providing a decentralized system for providing an optimized environment in a room, the system comprising:
  a balanced ventilation system configured to extract air from the room and exhaust the air to an external environment, but also to draw replacement air into the room, thus maintaining the air pressure within the room, and
  a fluid system, the fluid system being a heat pump configured for transferring heat in the balanced ventilation system,
wherein:
  the balanced ventilation system and the fluid system are both arranged in a housing,
  the fluid system comprises a suspended compressor enclosed in the housing,
  the compressor is suspended by three or more springs within the housing, the springs being adapted to absorb vertical vibrations from the compressor, and
  the springs are attached to the compressor at a horizontal plane at the compressor's center of gravity or less than 20% of the compressor's length above or below the compressor's center of gravity.

Suspending the compressor of the heat pump within the housing allows for elimination of almost all transmission of sound and vibrations to an external cabinet/room/housing and will make the decentralised system quieter. The springs are mainly adapted to absorb the vertical vibrations from the compressor since these may be the only vibrations that can be transferred to the housing of the decentralised system and make noise by virtue of the compressor being suspended. The horizontal movement/forces/vibrations may not be of a factor in the transfer of vibrations.

The location of the attachment of the springs may ensure that the amount of vertical movement at the attachment plane of the springs is minimized and the efficiency of the vibration dampening by the springs is maximized In some embodiments, the springs may have a vertical component, such as being vertical. Hereby the springs will be efficient in absorbing vertical forces/vibration.

The attachment of the springs could in an embodiment also be done closer to the compressor's center of gravity, such as 10% of the compressor length below or above the compressor's center of gravity, more preferably 5%.

In an embodiment, having the springs being positioned as vertical, this will ensure optimal absorption of the vertical vibrations and forces, as in such an arrangement no or very little horizontal movement/vibration/force may be absorbed.

In preferable embodiments, the springs may be attached to the compressor evenly distributed horizontally around the compressor's center of gravity to evenly distribute the vertical forces at the compressor's center of gravity to the springs. This will ensure that each spring will in most situations absorb the same amount of vibrations/forces from the compressor.

In embodiments, the ventilation system and the fluid system may be arranged in the housing in such a way that at least part of the ventilation system may be in heat exchange contact with at least part of the fluid system, and the ventilation system comprises:
  an inlet channel arranged in the housing configured for inletting air into the room and an outlet channel arranged in the housing configured for outletting air from the room;

a heat exchanger configured for exchanging heat between air flowing through the inlet channel and air flowing through the outlet channel;

a first fan and a second fan arranged in the inlet channel and the outlet channel respectively downstream of the heat exchanger, for providing a controllable volumetric airflow through the inlet and outlet channels;

a bypass mechanism for allowing air flowing through the inlet channel to bypass the heat exchanger; and a recirculation mechanism for allowing indoor air and/or outdoor air to be re-circulated through the decentralized system;

wherein the fluid system preferable comprises:

a first condenser/evaporator, a second condenser/evaporator, the suspended compressor, an expansion device, fluid lines fluidly connecting the first condenser/evaporator with the compressor and the expansion device and fluidly connecting the second condenser/evaporator with the compressor and the expansion device to form a closed fluid system, a fluid flowing in the closed fluid system when in use, and a four-way valve connected to the fluid lines, configured for changing the flow of fluid in the fluid system, such that the function of the first condenser/evaporator and the second condenser/evaporator can be exchanged.

In preferred embodiments, the compressor may comprise three or more attachment members positioned evenly horizontally around the compressor's center of gravity, and each of the attachment members may be attached to a corresponding one of to the three or more springs.

In preferred embodiments, the compressor may be located within a sound and airtight casing, the springs may be attached to the ceiling of the sound and airtight casing, and the casing may contain openings for the fluid lines stemming from the compressor.

In preferred embodiments, the springs and/or the attachment members may be attached evenly and equidistant around the compressor to evenly distribute the forces acting on the compressor's center of gravity to the three or more springs.

In preferred embodiments, the fluid lines stemming from the compressor may be flexible tubes with no mechanical contact to the sound and airtight casing to ensure that no vibrations from the compressor is transferred to the housing.

In preferred embodiments, the sound and airtight casing openings may contain flexible rubber gaskets, and the flexible tubes from the compressor may be adapted to run through and be contained in the openings in such a way as to eliminate sound and vibration transmission from the flexible tubes to the housing of the fluid system.

In preferred embodiments, the system may further comprise a serial condensate collection system for collecting condensate in the decentralized system, the serial collection system may comprise:

condensate collectors which may be located beneath each of the first and second condensers/evaporators and on each side of the heat exchanger, whereby at least four condensate collectors may be located in the decentralised system, level control sensors which may be located in each condensation collector for measuring the level of condensate in the condensate collectors, condensate removal fluid lines connecting each condensate collector individually to a central fluid line, wherein each condensate collector has an individually controllable valve for allowing condensate to flow to the central fluid line from the condensate collectors through the condensate removal fluid lines, wherein the central fluid line may be connected to a pump for the removal of the condensate and an outlet for removing the condensate.

In preferred embodiments, the level control sensors may be connected to a control for condensate, CTC, system, the CTC may be adapted to send out an external alarm signal when levels in the condensate collectors reach pre-determined thresholds and to control the position of the valves.

In preferred embodiments, the system may further comprise a bypass mechanism which may comprise:

a bypass passage arranged in the housing configured for fluidly connecting the inlet channel upstream of the heat exchanger with the inlet channel downstream of the heat exchanger, a bypass door having a first and a second configuration, wherein in the first configuration, the bypass door may be arranged such that it blocks the bypass passage and allows air to flow through the heat exchanger; and in the second configuration, the bypass door may be arranged such that it blocks the inlet channel upstream of the heat exchanger and allows air to flow through the bypass passage, and preferably, wherein the recirculation mechanism may comprise an indoor air recirculation mechanism which may comprise an indoor air recirculation passage which may be arranged in the housing which may be configured for fluidly connecting the outlet channel upstream of the heat exchanger with the inlet channel downstream of the heat exchanger, a first recirculation door which may have a first and a second configuration, wherein in the first configuration, the first recirculation door may be arranged such that it blocks the indoor air recirculation passage and allows air to flow through the outlet channel;

in the second configuration, the first recirculation door may be arranged such that is it blocks the outlet channel upstream of the heat exchanger and allows air to flow through the indoor air recirculation passage, such that indoor air is recirculated through the decentralized system, and;

an outdoor air recirculation mechanism which may comprise an indoor air recirculation passage which may be arranged in the housing configured for fluidly connecting the inlet channel upstream of the heat exchanger with the outlet channel downstream of the heat exchanger;

a second recirculation door having a first and a second configuration, wherein in the first configuration, the second recirculation door may be arranged such that it blocks the indoor air recirculation passage and allows air to flow through the inlet channel; and in the second configuration, the second recirculation door is arranged such that may block the inlet channel upstream of the heat exchanger and allow air to flow through the indoor air recirculation passage, such that outdoor air is recirculated through the decentralized system.

In embodiments, the decentralized system may further comprise a first service door and/or a second service door each having a first and a second configuration, wherein
in a first configuration, the first and second service doors (18, 19) may be closed, and
in a second configuration,
the first service door may be arranged such that it provides an opening in the housing allowing air to flow through the opening and into the outlet channel downstream of the heat exchanger; and
the second service door is arranged such that it provides an opening in the housing allowing air in the inlet channel to flow out of the housing upstream of the heat exchanger.

In embodiments, a control system may be configured to operate the decentralized system by controlling:
the state of the bypass door;
the state of the first and second recirculation doors;
the state and discharge rate of the first fan and the second fan;
state and discharge rate of the compressor;
the state of the four-way valve;
the state of the first and second service doors;
whereby the decentralized system can be operated in a plurality of modes and wherein the control system further comprise at least one control unit and one or more sensors configured for providing input signals to the control unit, such that the control system may regulate the decentralized system by changing between the plurality of modes of operation dependent on sensor inputs to provide a predetermined optimized environment in the room with minimal energy usage.

In another aspect of the invention a method for controlling the removal of condensate in the decentralized system is provided, the method may comprise
monitoring the condensate level in the condensate collectors by use of the level control sensors,
determining when the condensate level in the condensate collectors exceeds predefined thresholds,
opening the valves of the condensate collectors when the condensate level exceeds the predefined threshold, while keeping the valves of the non-active condensate collectors in a closed position,
pumping the condensate out of the condensate collectors using the pump.

The Control System

In some embodiments, the control system is configured to regulate the decentralized system by controlling the state of
the bypass door,
the first and second recirculation doors,
the state and discharge rate of the first fan and the second fans,
the state and discharge rate of the compressor,
the state of the four-way valve, and
the state of the first and second service doors
whereby the decentralized system can be operated in a plurality of modes.

The system of the present invention can be arranged in several modes of operation advantageous under different conditions. This can be achieved by regulating the state of the bypass door, the first and second recirculation doors, the first and second service doors, the activation of the fluid system and the direction of flow within the fluid system through regulation of the four way valve, the activation of the defrost heater and optionally the addition of other elements.

Thus, the control system can operate the decentralized system in a plurality of different modes of operation, by regulating the state of different components of the system.

Table 1 illustrates an example of a plurality of different modes of operation available in a decentralized system comprising a bypass door, a first recirculation door, a second recirculation door, a fluid system, a defroster, and a first and a second fan. The states of the different components in each mode of operation are denoted 0, 1, 2, −, +. The meaning of the denotations for each component are shown in table 2. Furthermore, the denotation X/Y may be used, where / means that the mode may be either X or Y.

TABLE 1

| Mode of operation | BP door | 1RC door | 2RC door | Fluid system | Defroster | First fan | Second fan |
|---|---|---|---|---|---|---|---|
| Ventilation w. HR | 1 | 1 | 1 | − | − | + | + |
| HP heating | 1 | 1 | 1 | +2 | + | + | + |
| HP cooling | 1 | 1 | 1 | +1 | − | + | + |
| Defrost | 2 | 1 | 1 | − | + | + | + |
| Bypass | 2 | 1 | 1 | − | − | + | + |
| Cooling recovery | 1 | 1 | 1 | − | − | + | + |
| Comfort heater | 1 | 1 | 1 | − | + | + | + |
| HP RC Cooling | 1 | 2 | 2 | +1 | − | + | + |
| HP RC Heating | 1 | 2 | 2 | +2 | − | + | + |
| HP RC Defrost | 1 | 2 | 2 | − | + | + | + |
| HP RC Dehumid | 1 | 2 | 2 | +1 | + | + | + |
| Indoor air cleaner | 1 | 2 | 2 | − | + | + | − |
| Heat conservation | 1 | 2 | 2 | − | + | + | − |
| Natural ventilation | ½ | 1 | 1 | − | − | +/− | +/− |
| Closed | 1 | 2 | 2 | − | − | − | − |

TABLE 2

| | First conf/mode/state | Second/third conf/mode/state | Active | Inactive |
|---|---|---|---|---|
| Bypass (BP) door | 1 | 2 | | |
| First recirculation (1RC) door | 1 | 2 | | |
| Second recirculation (2RC) door | 1 | 2 | | |
| First fan | | | + | − |
| Second fan | | | + | − |
| Fluid system | +1 | +2 | + | − |
| Defroster | | | + | − |
| Service doors | 1 | 2 | | |

In some embodiments, the control system of the present invention will focus first on maintaining temperature, and will then use the full capacity in recirculating indoor and outdoor modes, arriving as quickly as possible to a comfortable level. Then it will change to demand controlled ventilation with exchange of fresh air with heating or cooling recovery, if prompted to do so by sensors. Otherwise, it will simply maintain temperatures with recirculation mode at lowest possible capacity according to climatic conditions.

Definition of Upstream and Downstream

The terms upstream and downstream are herein used to define the arrangement of components of the ventilation system in relation to each other in the inlet channel and the outlet channel.

BRIEF DESCRIPTION OF THE FIGURES

The system according to the present invention will now be described in more detail with regard to the accompanying figures. The figures show one way of implementing the present invention and is not to be construed as being limiting to other possible embodiments falling within the scope of the attached claim set.

DETAILED DESCRIPTION OF THE INVENTION

The present invention relates to a decentralized system comprising a ventilation system and a fluid system in the same housing. The fluid system is in most embodiments a heat pump. Furthermore, the system comprises a control system configured for controlling both the ventilation system and the fluid system and thereby for controlling the decentralized system in a plurality of modes which would not be possible with two separate systems.

Due to the complexity of the system, embodiments of the ventilation system and the fluid system will first be described separately with reference to FIGS. 1-4 and FIG. 5, respectively. Hereafter embodiments of the decentralized system comprising the ventilation system and the fluid system will be described with reference to FIG. 6. The combined system may comprise any combination of embodiments of the ventilation systems and embodiments of the fluid systems described herein.

Figure 7:
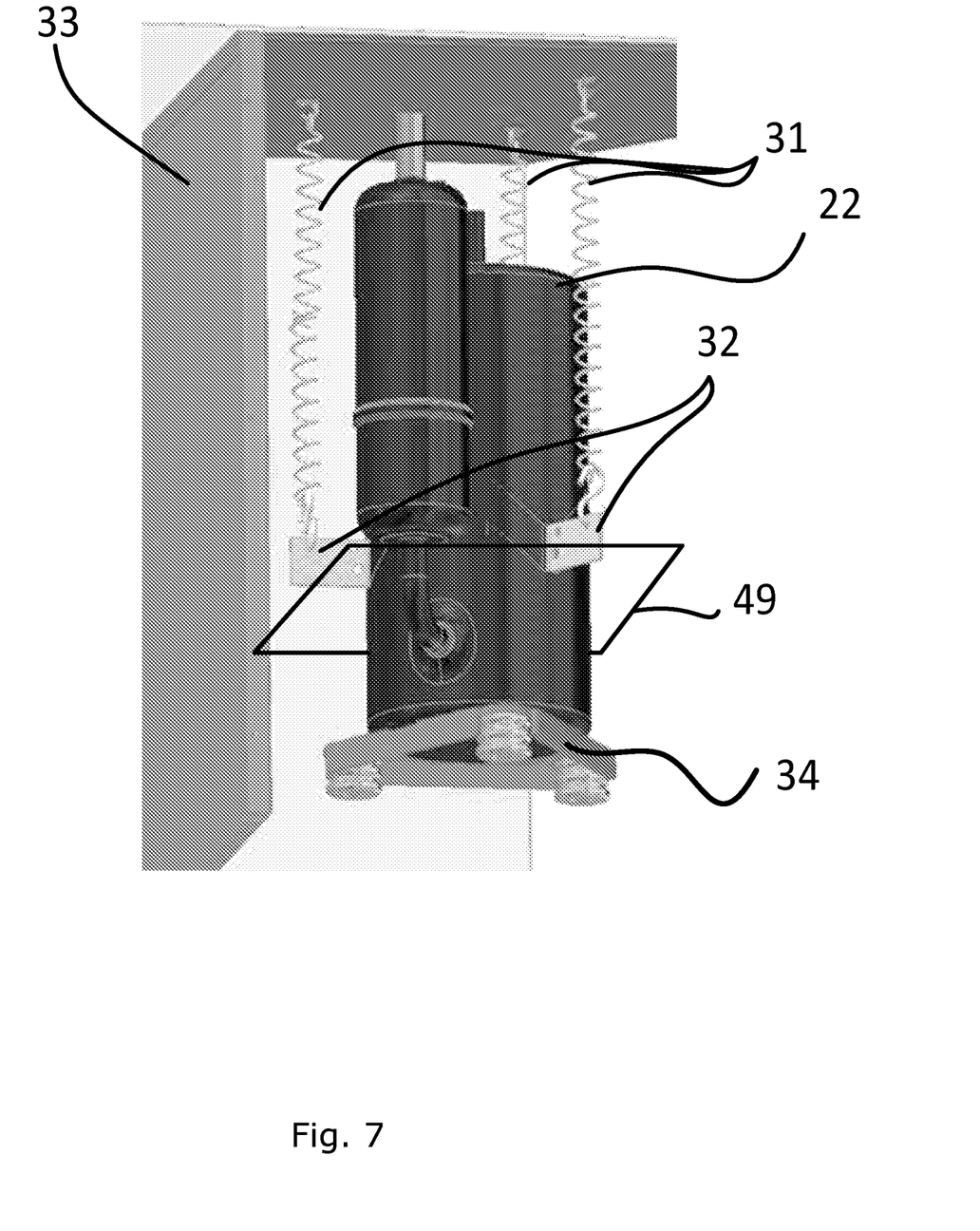
FIG. 7 shows an embodiment of the dampened compressor.

In order for the decentralised system to be placed within a room and not generate uncomfortable levels of noise the fluid system contains a vibration and sound dampened compressor, see FIG. 7. This is accomplished by the fluid system, here a heat pump, comprising a suspended compressor 22 within the housing 4.

The illustrated compressor 22 is suspended by three springs 31 attached to the compressor parallel to each other. In this embodiment, the springs 31 are vertical.

The springs are attached to the compressor at a horizontal plane at the compressor's center of gravity or less than 20% of the compressor's length above or below the compressor's 22 center of gravity. This will further ensure that vertical vibrations from the compressor are absorbed by the springs 31 so that minimal vibrations are transferred to the room. The vertical vibrations are the smallest at the compressor's center of gravity.

In some embodiments, the springs may be vertically attached to the compressor. By having the springs attached vertically to the compressor will ensure that vertical vibrations of the compressor are effectively absorbed by the springs, since vertical springs will mainly absorb vertical vibrations and very little of the horizontal forces.

If the vertical springs are further attached to the horizontal plane at the compressor center of gravity or in vicinity, such as 10% of the length of the compressor from the center of gravity plane, the absorbing of the vertical forces is further enhanced. This is due to the fact that at the center of gravity, movements of the compressor will consist of mostly horizontal movements and very small vertical forces/vibrations, which result in almost no forces/vibrations that need absorbing vertically and thereby will improve the transfer of the vertical forces. In such an embodiment, the combination of choosing an attachment plane with minimum movement, which is mainly in the horizontal direction, and absorbing the few remaining vertical forces by the springs 31, ensures an effective elimination of vibrations from the compressor to the external cabinet by absorption by the springs. The less vibration/forces of the compressor at the attachment plane, the more complete the absorption can be.

The use of vertical springs therefore allows for the absorption of mainly the vertical forces, however, non-vertical springs can be used in the suspended compressor. The main point is that the compressor is suspended and that the vertical forces are absorbed.

The compressor is allowed to move horizontally and horizontal components of the compressor's vibrations are preferably not absorbed by the springs. Furthermore, other movements of the compressor are preferably allowed to exist. Such an arrangement is ideal in minimizing the vibrations and sounds of the decentralised system, since due to the compressor being suspended, only vertical forces can be transferred to the casing and cause noise and vibrations. The springs should therefore be adapted to absorb effectively the vertical vibration/forces. Having vertical springs could in an embodiment be a way of effectively absorbing the vertical vibration, but other ways are envisioned.

The closer to the center of gravity, the less vertical vibrations will be exerted by the compressor, and the better the transfer of these forces/vibrations to the springs are, the quieter the compressor will be.

In some embodiments, the horizontal forces could be absorbed as well, but the springs should be adapted to mainly maximise the absorption of vertical vibrations/forces.

Figure 1:
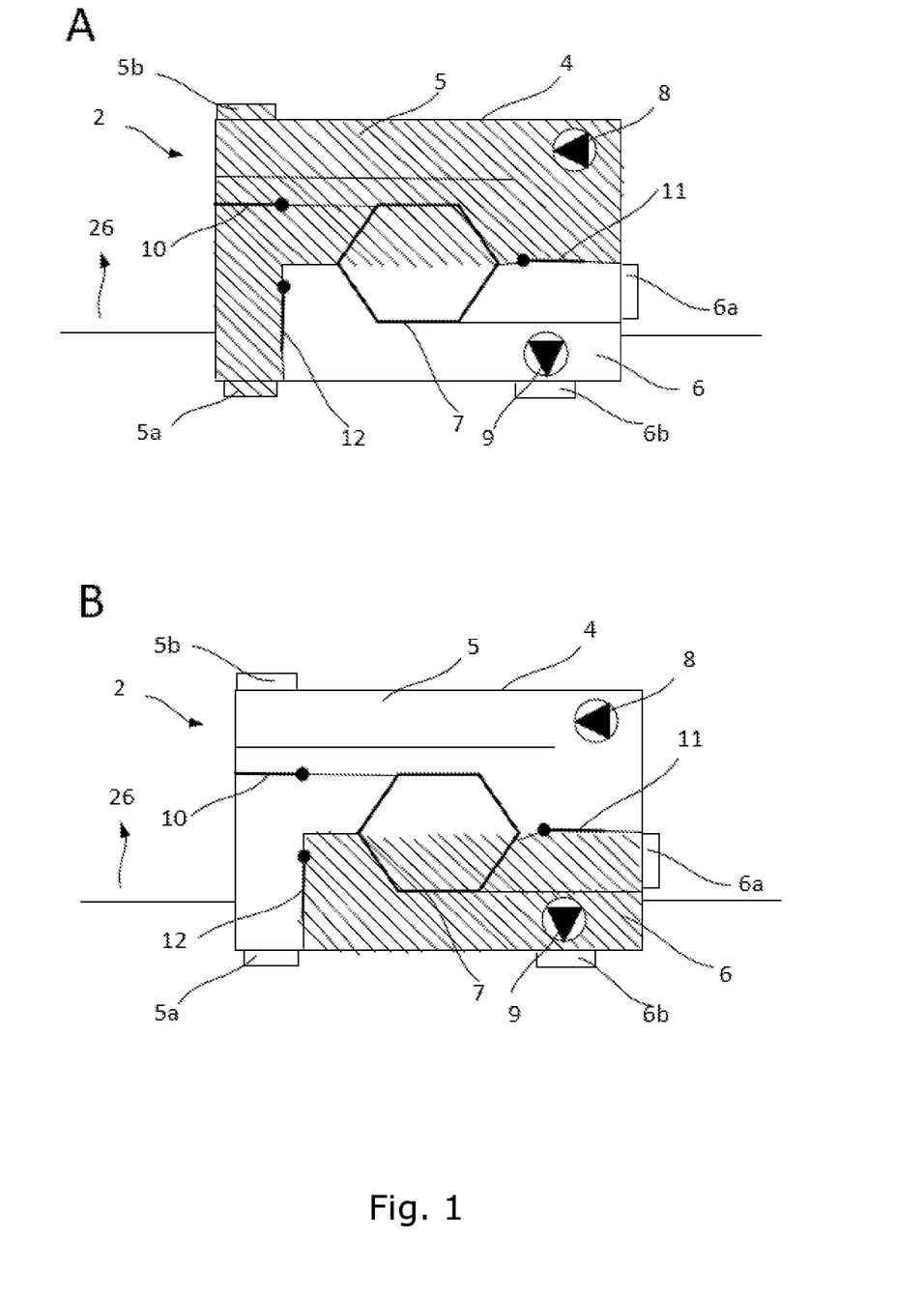
FIG. 1 is a schematic illustration of a ventilation system in a housing of the decentralized system according to an embodiment of the present invention.

Reference is made to FIG. 1 illustrating a schematic diagram of a simple embodiment of a ventilation system 2 according to the present invention.

The ventilation system 2 illustrated in FIG. 1 comprises a housing 4 having an inlet channel 5 configured for inletting air into a room 26, as well as an outlet channel 6 configured for outletting air from a room 26. The outer walls and the inner walls of the housing 4 together define the inlet channel 5 and outlet channel 6. FIGS. 1A and 1B are identical except from the hatched areas. In FIG. 1A, the hatched area defines the inlet channel 5, whereas in FIG. 1B, the hatched area defines the outlet channel 6. It should be noted that the inlet channel 5 and outlet channel 6 may take many different forms and that a two-dimensional illustration may not be sufficient to show the exact configuration. The important thing is that the inlet channel 5 is configured for inletting air into a room 26, and that the outlet channel 6 is configured for outletting air from the room 26

The housing 4 is configured to be installed in a room 26 such that both the inlet channel 5 and the outlet channel 6 are each fluidly connected to both the room 26 and an external environment outside the room 26.

The inlet channel 5 and outlet channel 6 each have an inlet opening 5a, 6a and an outlet opening 5b, 6b. The inlet openings 5a, 6a and outlet openings 5b, 6b are the openings between the inner housing 4 and a room 26 or an external environment. Such inlet openings 5a, 6a and outlet openings 5a, 5b may be arranged differently in the housing and have many forms or shapes. Furthermore, the inlet openings 5a, 6a and/or outlet openings 5b, 6b may be covered by grits.

In the illustration of the ventilation system shown in FIG. 1, a heat exchanger 7 is arranged within the housing 4, configured for exchanging heat between air flowing through the inlet channel 5 and air flowing through the outlet channel 6. Preferably, the heat exchanger 7 comprise a first heat exchange section (not illustrated) extending inside the inlet channel 5 and a second heat exchange section (not illustrated) extending inside the outlet channel 6. The first section and the second section are thermally coupled to exchange heat between the two sections.

Furthermore, a first fan 8 is arranged in the inlet channel 5 downstream of the heat exchanger 7, whereas a second fan 9 is arranged in the outlet channel 6 downstream of the heat exchanger 7. The fans 8,9 are configured for providing a controllable volumetric airflow through the channels 5,6. The discharge rates of the first fan 8 and of the second fan 9 are preferably controlled by the control system (not illustrated), but may also be manually operable.

The ventilation system 2 shown in FIG. 1 also comprises a bypass mechanism for allowing air flowing through the inlet channel 5 to bypass the heat exchanger 7 and a recirculation mechanism for allowing indoor and/or outdoor air to be re-circulated through the housing 4.

The bypass mechanism may comprise a bypass passage (not visible) and a bypass door 10 whereas the recirculation mechanism may comprise an indoor air recirculation passage (not visible), an outdoor air recirculation passage (not visible), a first recirculation door 11 and a second recirculation door 12. An example of the arrangement of such doors 10, 11, 12 in the inner walls of the housing 4 is shown in FIG. 1. The bypass mechanism and the recirculation mechanisms will be described in more detail with reference to FIG. 3 below.

Figure 2:
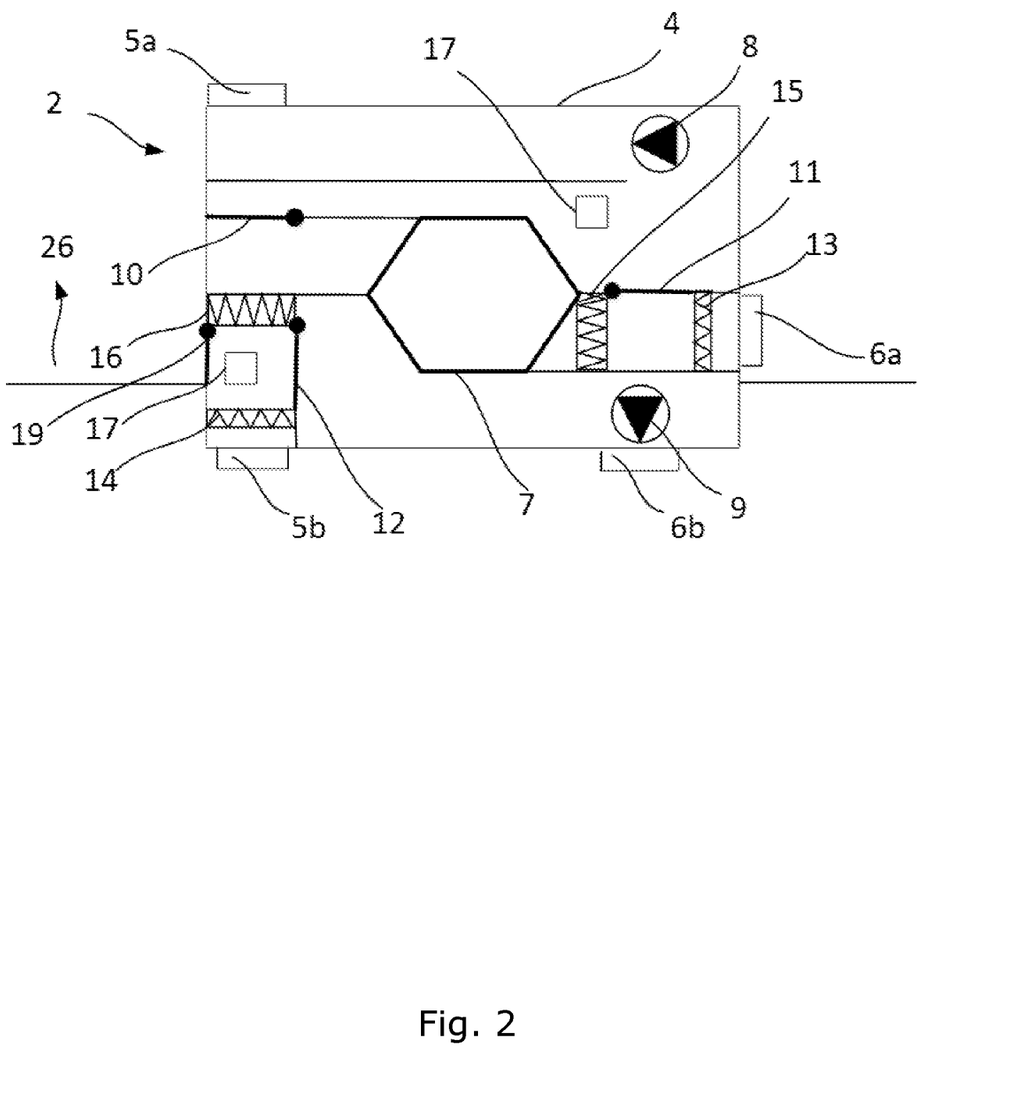
FIG. 2 is a schematic illustration of a ventilation system in a housing of the decentralized system according to another embodiment of the present invention.

Reference is made to FIG. 2 illustrating a schematic diagram of another embodiment of a ventilation system 2 according to the present invention. The ventilation system 2 illustrated in FIG. 2 is similar to that of FIG. 1, except that it further comprises four air filters 13, 14, 15, 16, two electrical defrost heaters 17 and a second service door 19. The air filters 12, 14, 14, 16, the electrical defrost heaters 17, and the service door 19 are not essential but have several advantages. Any number of air filters 12, 14, 14, 16 and electrical defrost heaters can be used in a ventilation system according to the present invention. Furthermore, one, two or even more service doors 18, 19 may be present.

In the embodiment illustrated in FIG. 2, two air filters 14, 16 are arranged in the inlet channel upstream of the heat exchanger 7 and two air filters 13, 15 are arranged in the outlet channel upstream of the heat exchanger 7. A first air filter 13 is arranged in the outlet channel 6 upstream of the indoor air recirculation passage 28; whereas a second air filter 14 is arranged in the inlet channel 5 upstream of the outdoor air recirculation passage. These air filters 13, 14 are preferably arranged just after the inlet openings 5a, 5b and are configured to filter all air entering the ventilation system 2.

Furthermore, a third air filter 15 is arranged in the outlet channel 6 downstream of the indoor air recirculation passage 28 but upstream of the heat exchanger 7, and a fourth air filter 16 is arranged in the inlet channel 5 downstream of the outdoor air recirculation passage 29 but upstream of the bypass passage. These filters 15, 16 preferably have smaller pores than the first air filter 13 and the second air filter 14, thereby being able to filter smaller particles. The third and fourth air filters 15, 16 are arranged such that during specific modes of operation, air may be directed away from the inlet channel 5 or outlet channel 6 upstream of these air filters, such that air is not filtered through the third and fourth air filters 45, 16, but only through the first and second air filters 13, 14.

An electric defrost heater 17 is arranged in the inlet channel 15, downstream of the heat exchanger 7, whereas another electric defrost heater 17 is arranged in the inlet channel 5 upstream of the heat exchanger. Such electric defrost heaters are configured for heating air flowing in the inlet channel 5 upstream and/or downstream of the heat exchanger when necessary.

Furthermore, a second service door 19 is arranged in an outer wall of the housing 4. The second service door 19 has a first and a second configuration. In the first configuration, the second service door 19 is closed, whereas in the second configuration, the second service door 19 is arranged such that it provides an opening in the housing 4 allowing air in the inlet channel 5 to flow out of the housing upstream of the heat exchanger 7. The service door 19 is arranged such that access to the second and fourth air filters 14, 16 is possible. Preferably, it is arranged in a wall of the lower part of the housing 4. However, as the illustration in FIG. 2 is not three-dimensional, the service door 19 is shown as being arranged in a sidewall of the housing 4 instead. The opening provided by the second service 19 door fluidly connects the inlet channel 5 with an inside environment, such as a room 26. In this way, when the second service door is in a second configuration, outside air can flow into the inlet channel 5 and out into the room 26 through the second service door 19, thereby circumventing the fourth air filter 16 and the heat exchanger 7. Some air may flow through the heat exchanger 7, but as the flow resistance is significantly decreased when air does not have to flow through the fourth air filter 16 and heat exchanger 7, air will primarily flow through the opening provided by the open service door 19. As the resistance is decreased, the power of the electrically powered first fan 8 can be reduced without decreasing the volume of air flowing through the ventilation system. In this way, large amounts of fresh air can be inlet into a building through the system with a reduced energy consumption.

Figure 3:
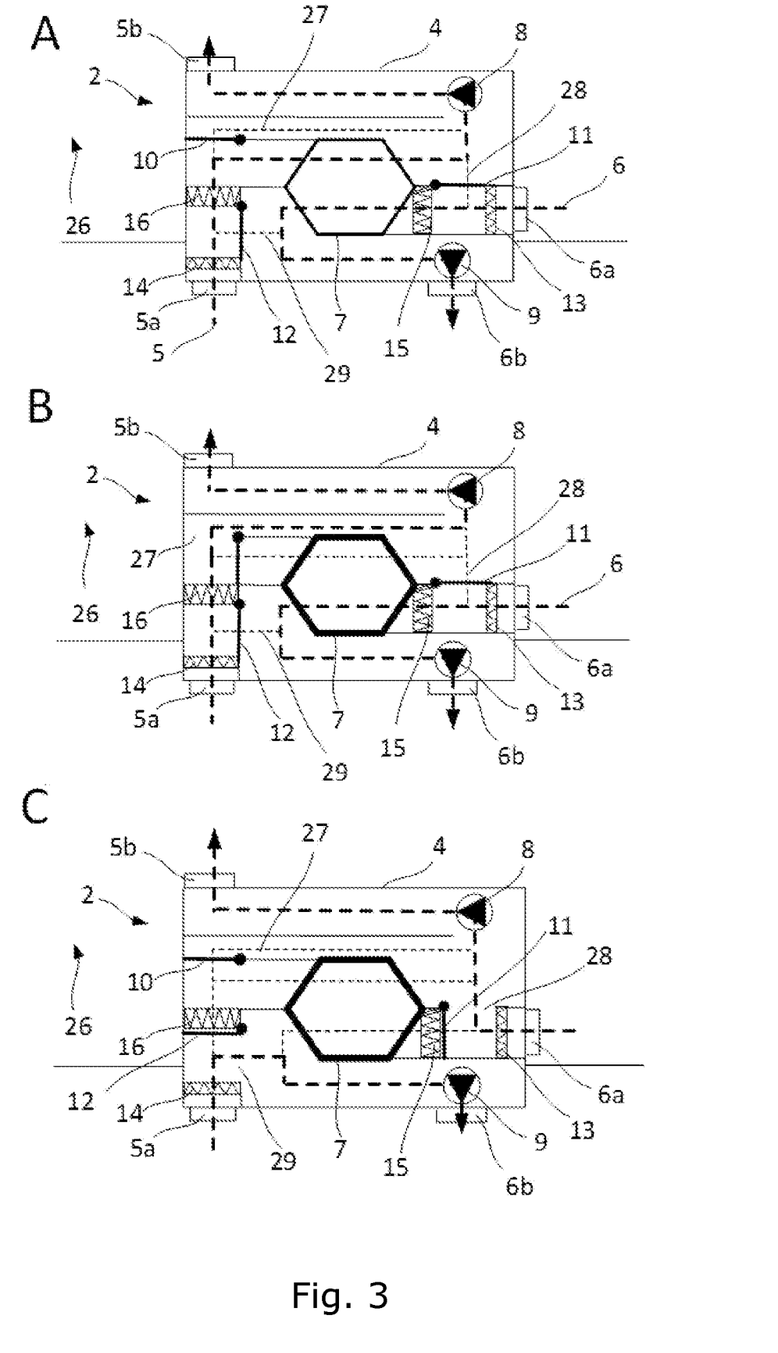
FIG. 3 is a schematic illustration of the ventilation system in a housing of the decentralized system according to an embodiment of the present invention, where the flow of air through the ventilation system is illustrated depending on the state of the bypass door and first and second recirculation doors.

Reference is made to FIG. 3 illustrating the flow of air through a ventilation system 2 according to the present invention and how the flow of air through the housing 4 can be changed by means of the bypass mechanism and the recirculation mechanism. FIG. 3 shows a system similar to that of FIG. 2, except from the defrost heaters and the second service door, which is not present in FIG. 3.

The larger dotted lines in FIG. 3 illustrate the flow of air through the housing in the different modes of operation, when the first and second fans 8, 9 are active.

The smaller dotted lines illustrate alternative flows of air through the housing in different modes of operation.

In the embodiment shown in FIG. 3, the bypass mechanism comprises a bypass passage 27 and a bypass door 10 arranged in the housing 4. The bypass passage 27 is configured to fluidly connect the inlet channel 5 upstream of the heat exchanger 7 with the inlet channel 5 downstream of the heat exchanger 7. The bypass passage may simply be a hole or an opening in an inner wall of the housing, or it may be an actual passage. The bypass door 10 can be arranged in a first and a second configuration. In the first configuration, as illustrated in FIGS. 3A and 3C, the bypass door is arranged to block the bypass passage 27 such that air flows through the inlet channel 5 including the heat exchanger 7. In the second configuration, as illustrated in FIG. 3B, the bypass door 10 is arranged such that it blocks the inlet channel 5 upstream of the heat exchanger 7 and allows air to flow through the bypass passage 27, thereby circumventing the heat exchanger 7. The control system is configured to control the state of the bypass door by moving the bypass door between the first and second configuration.

The recirculation mechanism comprises an indoor air recirculation mechanism configured for allowing indoor air to be re-circulated through the ventilation system 2 and an outdoor air recirculation mechanism for allowing indoor air to be re-circulated through the housing. The indoor air recirculation mechanism comprises an indoor air recirculation passage 28 and a first recirculation door 11. The indoor air recirculation passage 28 is configured for fluidly connecting the outlet channel 6 upstream of the heat exchanger 7 with the inlet channel 5 downstream of the heat exchanger 7. The indoor air recirculation passage 28 may simply be a hole or an opening in an inner wall of the housing, or it may be an actual passage. The first recirculation door 11 has a first and a second configuration. In the first configuration, as illustrated in FIGS. 3A and 3B, the first recirculation door 11 is arranged such that it blocks the indoor air recirculation passage 28 and allows air to flow through the outlet channel 6. In the second configuration, as illustrated in FIG. 3C, the first recirculation door 11 is arranged such that is it blocks the outlet channel 6 upstream of the heat exchanger 7 and allows air to flow through the indoor air recirculation passage 28, such that indoor air is recirculated through the decentralized system 1. The control system is configured to control the state of the first recirculation door 11 by moving the first recirculation door 11 between the first and second configuration.

In the same way, the outdoor air recirculation mechanism comprises an outdoor air recirculation passage 29 and a second recirculation door 12. The outdoor air recirculation passage 29 is arranged in the housing 4 configured for fluidly connecting the inlet channel 5 upstream of the heat exchanger 7 with the outlet channel 6 downstream of the heat exchanger 7. The outdoor air recirculation passage 29 may simply be a hole or an opening in an inner wall of the housing 4, or it may be an actual passage. The second recirculation door 12 has a first and a second configuration. In the first configuration, as illustrated in FIGS. 3A and 3B, the second recirculation door 12 is arranged such that it blocks the outdoor air recirculation passage 29 and allows air to flow through the inlet channel 5. In the second configuration, as illustrated in FIG. 3B, the second recirculation door 12 is arranged such that it blocks the inlet channel 5 upstream of the heat exchanger 7 and allows air to flow through the outdoor air recirculation passage 29, such that outdoor air is recirculated through the decentralized system 1. The control system is configured to control the state of the second recirculation door 12 by moving the second recirculation door 12 between the first and second configuration.

By controlling the state of the bypass door 10 as well as the first and second recirculation doors 11, 12, the control system (not illustrated) can operate the ventilation system in a plurality of modes. Three examples of different modes of operation are shown in FIGS. 3A, 3B and 3C.

It should be noted that further possible modes of operation require that the bypass door 10 and only one recirculation door 11, 12 is in the first configuration, whereas the other recirculation door 11, 12 is in the second configuration. In yet another mode of operation, the bypass door 10 and only one recirculation door 11, 12 is in the second configuration, whereas the other recirculation door 11, 12 is in the first configuration.

Figure 4:
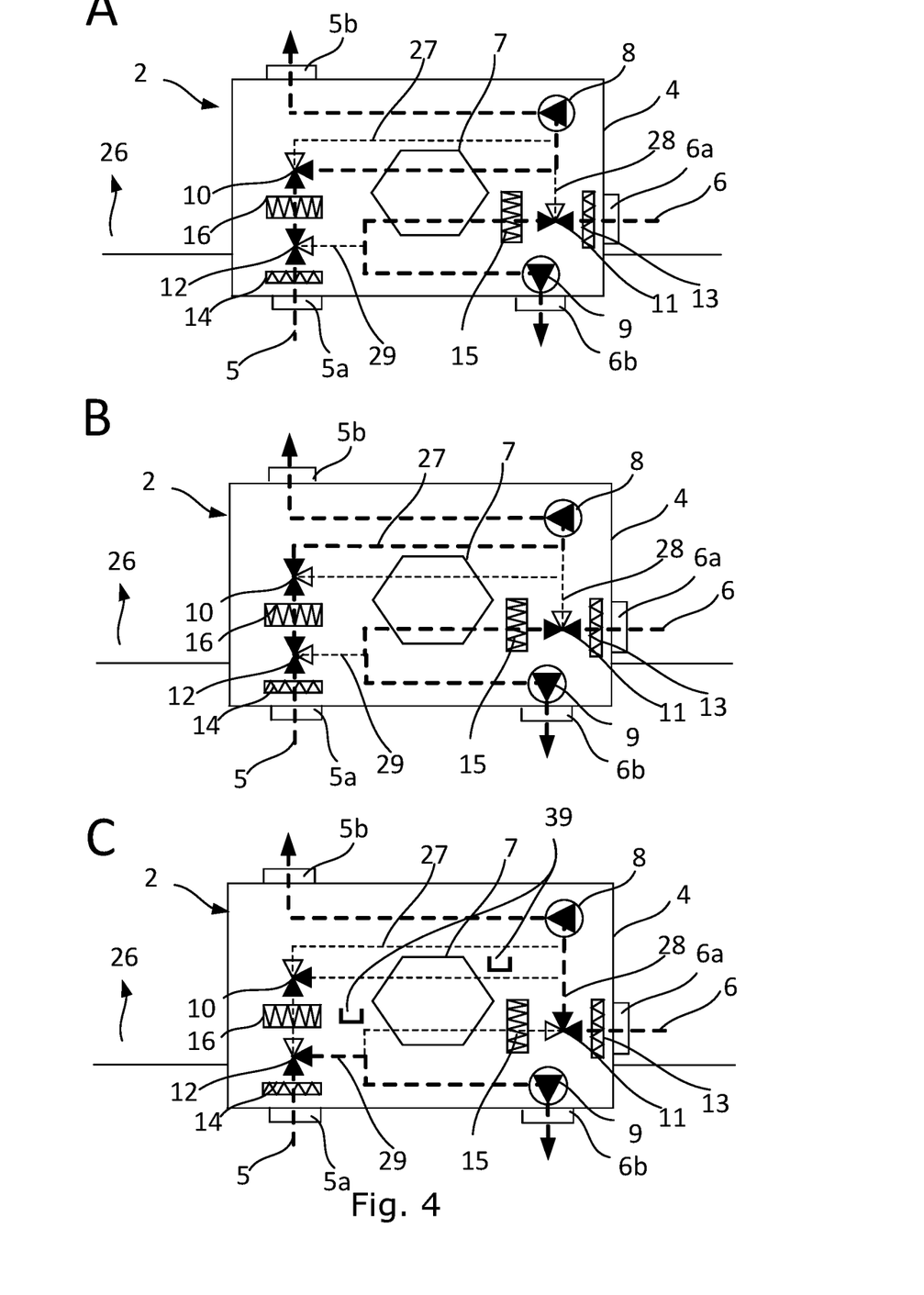
FIG. 4 is a schematic illustration of the flow of air through the housing of the decentralized system according to an embodiment of the present invention, where the flow of air through the ventilation system is illustrated depending on the state of the bypass mechanism and the recirculation mechanism.

Reference is made to FIG. 4 showing a more general embodiment of the ventilation system and the flow of air through the ventilation system according to the present invention. The inlet channel 5 and outlet channel 6 may be configured in many different ways within the housing 4 depending on the preferred arrangement of walls within the housing 4. Therefore, instead of showing the walls within the housing, the general flow of air through the inlet channel 5 and outlet channel 6 is illustrated in FIG. 4. Furthermore, since the bypass door is not necessarily a door and the bypass passage is not necessarily a passage, FIGS. 3B, 4B and 5B shows a more general embodiment of the bypass mechanism and recirculation mechanism, where three-way dampers can direct air in different directions depending on their configuration/mode/state. Other than that, FIG. 4 is identical to that of FIG. 3.

The flow of air through the inlet channel 5 is illustrated as larger dotted lines denoted 5 and the flow of air through the outlet channel will be illustrated as a larger dotted line denoted 6. The flow of air through other parts of the system, such as through the bypass passage, the indoor air recirculation passage and the outdoor air recirculation passage is denoted 27, 28 and 29 respectively. Alternative flows of air in the different modes are illustrated by smaller dotted lines.

Figure 5:
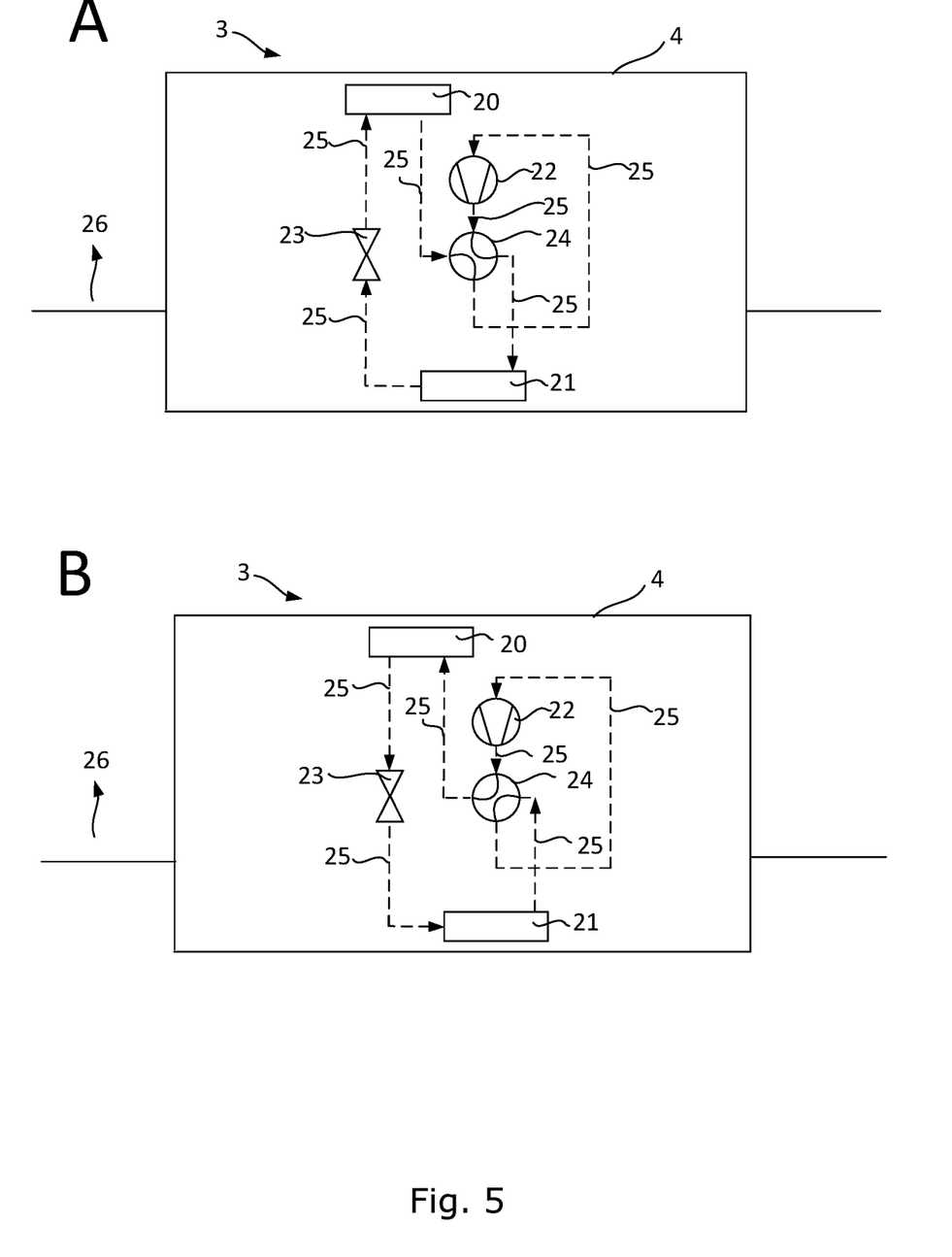
FIG. 5 is a schematic illustration of the fluid system in the housing of the decentralized system according to an embodiment of the present invention.

Reference is made to FIG. 5, illustrating a fluid system according to the present invention. The fluid system 3 comprises a first condenser/evaporator 20, a second condenser/evaporator 21, a compressor 22 and an expansion device 23. The fluid system 3 further comprises fluid lines 25 fluidly connecting the first condenser/evaporator 20 with the compressor 22 and the expansion device 23 and fluidly connecting the second condenser/evaporator 21 with the compressor 22 and the expansion device 23 to form a closed fluid system, wherein a fluid flows. Finally, the fluid system 3 comprises a four-way valve 24 connected to the fluid lines 25 and configured for changing the flow of fluid in the fluid system 3, such that the function of the first condenser/evaporator 20 and the second condenser/evaporator 21 can be exchanged. When the fluid system 3 is active, it can be operated in a first and a second mode depending on whether it is desired that the first condenser/evaporator 20 or the second condenser/evaporator 21 functions as a condenser or evaporator. In a first mode of operation, as illustrated in FIG. 5A, the four-way valve 24 is configured to lead the fluid from the compressor 22 to the second condenser/evaporator 21 and from the expansion device 23 to the first condenser/evaporator 20, such that the second condenser/evaporator functions as a condenser and the first condenser/evaporator functions as an evaporator. In the second mode of operation, as illustrated in FIG. 5B, the four-way valve 24 is configured to lead the fluid from the compressor 22 to the first condenser/evaporator 20 and from the expansion 23 device to the second condenser/evaporator 21, such that the second condenser/evaporator functions an evaporator and the first condenser/evaporator functions as a condenser.

Figure 6:
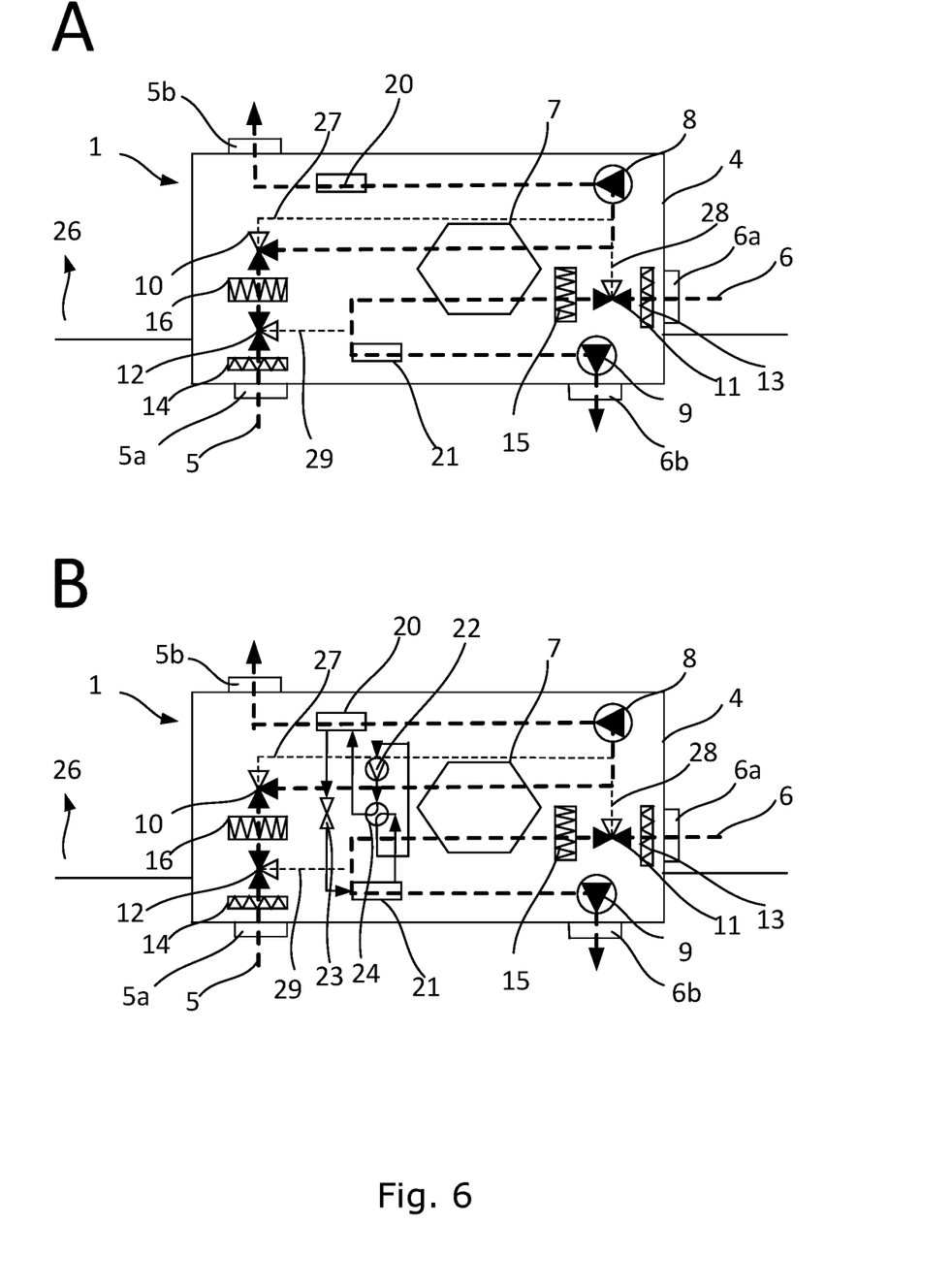
FIG. 6 is a schematic illustration of an embodiment of a decentralized system according to the present invention, wherein both a ventilation system and a fluid system is present within the same housing.

Reference is made to FIG. 6, illustrating an embodiment of a decentralized system 1 according to the present invention. FIG. 6B illustrates a decentralized system 1 comprising a ventilation system 2 as illustrated in FIG. 4A and a fluid system 3 as illustrated in FIG. 5B, arranged in the same housing 4. In FIG. 6B the ventilation system 2 as illustrated in FIG. 4A is shown. However, only the first and second condenser/evaporator 20, 21 is shown for clarity.

FIGS. 6A and 6B both illustrate how the first condenser/evaporator 20 may be arranged such that it is configured for heat exchange with air flowing in the inlet channel 5 downstream of the heat exchanger 7 and how the second condenser/evaporator 21 may be arranged such that it is configured for heat exchange with air flowing in the outlet channel 6 downstream of the heat exchanger 7. With this configuration, air flowing in the ventilation system can be heated or cooled by heat exchange with the fluid system when needed. It should be noted that the arrangement of elements of the ventilation system 2 and the fluid system 3 may be arranged differently, as long as the ventilation system 2 and the fluid system 3 are arranged in the housing 4 in a way such that at least part of the ventilation system 2 is in heat exchange contact with at least part of the fluid system 3. The other components of the fluid system may be arranged anywhere within the housing 4. Since FIG. 6 is only a two-dimensional view of the decentralized system, a three-dimensional decentralized system would obviously offer further possibilities of arrangement of different components and air passages within the housing 4. The control system is configured to control whether or not the fluid system is active and the state of the four-way valve such that it can control whether the first condenser/evaporator or second condenser/evaporator should function as a condenser or evaporator, and thereby whether air flowing in the inlet channel or outlet channel shall be heated or cooled by heat exchange with the fluid system.

The control system (not illustrated) can regulate the decentralized system 1 illustrated in FIG. 6 by altering the state/mode/configuration of the following components:
the bypass door 10;
the first and second recirculation doors 11, 12;
the state and discharge rate of the first fan 8 and the second fan 9;
the state and discharge rate of the compressor 22;
the state of the four-way valve 24;

Thereby, the decentralized system can be operated in a plurality of modes.

The control system comprises at least one control unit and one or more sensors configured for providing input signals to the control unit, such that the control system can regulate the decentralized system by changing between the pluralities of modes of operation dependent on sensor inputs, to provide a pre-determined optimized environment in a room with minimal energy usage.

Referring to FIG. 7, an embodiment of the suspended compressor 22 suspended by the three springs 31 is shown. As shown in FIG. 7, the springs 31 are attached to the compressor 22 at the horizontal plane of the compressor's center of gravity 49, but they could be attached to other position of the compressor, as long as the vertical vibrations can be absorbed by the springs.

Shown in FIG. 7 is an embodiment, where the suspended compressor 22 comprises three attachment members 32 positioned evenly horizontally around the compressor's center of gravity 49, the attachment members 32 being attached to the three springs 31. Such an arrangement ensures that the springs can be vertically attached, in embodiments where vertical springs are used, for the absorption of the vertical vibrations and in embodiments where the springs are not vertical, it allows for easy attachment.

In the embodiment shown in FIG. 7, the springs 31 are vertical to ensure optimal absorption of the vertical forces of the compressor.

The springs 31 are in one embodiment attached evenly and equidistantly around the compressor 22 by use of or without the use of the attachment members 32. This arrangement ensures even distribution of the forces of the compressor 22 to the three springs 31. It further ensures that the compressor 22 is suspended in a stable manner. However, other configurations can be used if more than three springs are used.

It is preferred that the springs 31 are attached at the same distance from the compressor's center of gravity point if attached at a horizontal plane at the center of gravity. The arrangement can be thought off as drawing a circle around the position of the compressor's center of gravity and attaching the springs to the circumference with the same angle between the springs, such that for three springs, a 120 degrees angle is between the attachments of the springs.

In order to fully isolate the compressor 22 from the room, the suspended compressor 22 is ideally placed within a sound and airtight casing 33, such that in some embodiments the springs 31 are attached to the ceiling of the casing 33.

The casing 33 will contain suitable openings 36 for the fluid lines of the compressor 22. This casing 33 will preferably be located within the housing of the decentralised system and will ensure that the system overall produces significant less noise and less vibrations are transferred to the room.

Figure 8:
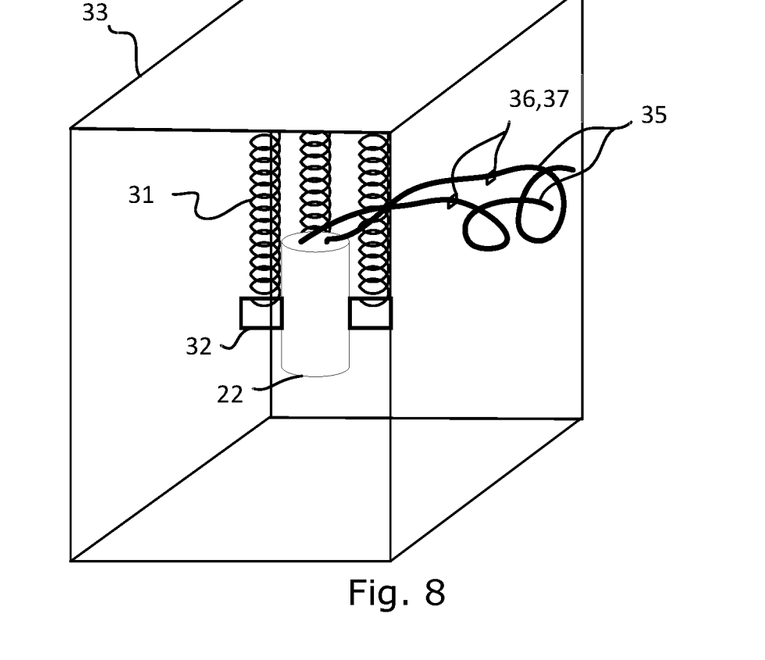
FIG. 8 shows an embodiment of the fluid lines within the sound and airtight casing.

When the compressor is within the sound and airtight casing, the fluid lines 25 stemming from the compressor 22 will, in an embodiment, be flexible tubes 35 with no mechanical contact to the sound and airtight casing 33. This will ensure that no vibrations from the compressor 22 is transferred to the housing 4 and subsequently to the room.

In FIG. 8, an embodiment wherein the sound and air tight casing 33 has openings 36 that contain flexible rubber gaskets 37 is shown. The flexible tubes 35 from the compressor are adapted to run through and be contained in the openings 36 in such a way as to eliminate sound and vibration transmission from the flexible tubes 35 to the housing 4 of the fluid system 3. Such an arrangement will ensure that the vibrations from the compressor 22 are isolated from the room.

Figure 9:
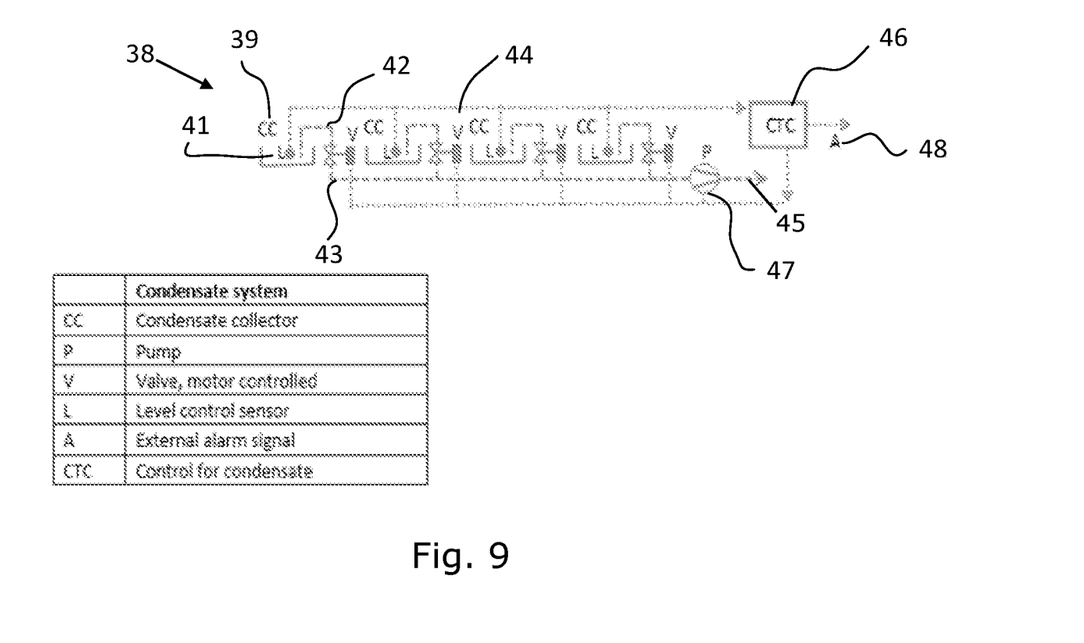
FIG. 9 shows an embodiment of the collection of condensation from the four condensers/evaporates.

As shown in FIG. 9, the decentralised system may further contain a serial condensate collection system 38 for collecting condensate in the decentralized system 1. This is due to the impracticality of having four separate condensate removal systems each requiring its own pump, wiring and tubing, which will overall complicate the system, making the decentralised system impractical. In order to adapt the decentralised system to the room, a serial condensate collection system 38 is in an embodiment utilized.

The serial collection system 38 comprises condensate collectors located beneath each of the condenser/evaporators 20, 21 on each side of the heat exchanger. The location of the condensate collector 39 is seen in FIG. 4c. In order to collect the condensate from the system at least four condensate collectors 39 are needed.

Each condensate collector has an associated level control sensor 41, preferably located within each condensate collector 39, that measures the level of condensate/water in the condensate collectors 39 and a condensate removal fluid line 42 connecting each condensate collector 39 individually to a central removal fluid line 43. The central fluid line 43 is connected to a pump 47 for facilitating the removal of the condensate and an outlet 45 for the removal of the condensate.

Such an arrangement allows for a single fluid line to, in a serial manner, connect and remove the condensate in the decentralised system. In order for the system to work, condensate from each of the collectors needs to be able to be individually removed, otherwise the pump will draw in air from open tubes and the effect of the pump will decrease. This is solved by each condensate collector 39 having an individually controllable valve 44 that controls the flow of the condensate from the collectors to the central fluid line.

Each level control sensor is connected to a control for condensate, CTC, system 46; the CTC 46 is adapted to send out an external alarm signal 48 when levels in the condensate collectors reach pre-determined thresholds and to control the position of the valves 44. The CTC system will monitor the water levels in the collectors and when necessary open the valve of that collector and initiate pumping of the condensate.

The method for controlling the removal of condensate in the decentralized system using the serial condensate system will therefore, in an embodiment, be comprised of:

monitoring the condensate level in the condensate collectors 39 by use of the level control sensors, determining when the condensate level in the condensate collectors 39 exceeds predefined thresholds, opening the valves 44 of the condensate collectors 39 when the condensate level exceeds the predefined threshold while keeping the valves of the non-active condensate collectors in a closed position, pumping the condensate out of the condensate collectors 39 using the pump 47.

Such a method and system will ensure that "false air", air from condensate collectors which are not full, will not be pumped into the pump. It will ensure that the removal of the condensate is quiet and will remove unnecessary vibrations. It will further improve the air tightness of the decentralized system since a serial removal system has few penetrations of airtight internal barriers compared to a parallel removal system.

Although the present invention has been described in connection with the specified embodiments, it should not be construed as being in any way limited to the presented examples. The scope of the present invention is set out by the accompanying claim set. In the context of the claims, the terms "comprising" or "comprises" do not exclude other possible elements or steps. In addition, the mentioning of references such as "a" or "an" etc. should not be construed as excluding a plurality. The use of reference signs in the claims with respect to elements indicated in the figures shall also not be construed as limiting the scope of the invention. Furthermore, individual features mentioned in different claims, may possibly be advantageously combined, and the mentioning of these features in different claims does not exclude that a combination of features is not possible and advantageous.

LIST OF REFERENCE SYMBOLS USED 1 decentralized system
2 ventilation system
3 fluid system
4 housing
5 inlet channel
6 outlet channel
7 heat exchanger
8 first fan
9 second fan
10 bypass door
11 first recirculation door
12 second recirculation door
13 first air filter
14 second air filter
15 third air filter
16 fourth air filter
17 electronic defrost heater
18 first service door
19 second service door
20 first condenser/evaporator
21 second condenser/evaporator
22 suspended compressor
23 expansion device
24 four way valve
25 fluid lines
26 room
27 bypass passage
28 indoor air recirculation passage
29 outdoor air recirculation passage
31 springs
32 attachment member
33 sound and air tight casing
34 spring array
35 flexible tubes
36 opening
37 rubber gaskets
38 serial condensate collection system
39 condensate collectors
40 heating coils
41 level control sensors
42 condensate removal fluid lines
43 central removal fluid line
44 controllable valve
45 outlet
46 control for condensate, CTC, system
47 pump
48 alarm signal
49 horizontal plane of the compressor's center of gravity

The invention claimed is:

1. A decentralized system for providing an optimized environment in a room, the system comprising:

a balanced ventilation system configured to extract air from the room and exhaust the air to an external environment, but also to draw replacement air into the room, thus maintaining air pressure within the room, and a fluid system, the fluid system being a heat pump configured for transferring heat in the balanced ventilation system, wherein:

the balanced ventilation system and the fluid system are both arranged in a housing, the fluid system comprises a suspended compressor enclosed in the housing, the compressor is suspended by three or more springs within the housing, the springs being adapted to absorb vertical vibrations from the compressor, wherein the suspended compressor is further located within a sound and air tight casing, the springs are attached to a ceiling of the sound and air tight casing, and the casing includes openings for fluid lines stemming from the compressor, wherein the fluid lines stemming from the compressor are flexible tubes with no mechanical contact to the sound and airtight casing to ensure that no vibrations from the compressor is transferred to the housing, wherein the sound and air tight casing openings include flexible rubber gaskets, and the flexible tubes from the compressor are adapted to run through and be contained in the openings in such a way as to eliminate sound and vibration transmission from the flexible tubes to the housing of the fluid system, and the springs are attached to the compressor at a horizontal plane at the compressor's center of gravity or less than 20% of the compressor's length above or below the compressor's center of gravity.

2. A decentralized system according to claim 1, wherein the springs are vertical components having a vertical position.

3. A decentralized system according to claim 1, wherein the springs are attached to the compressor evenly distributed horizontally around the compressor's center of gravity to evenly distribute the vertical forces at the compressor's center of gravity to the springs.

4. A decentralized system according to claim 1, wherein the ventilation system and the fluid system are arranged in the housing in a way such that at least part of the ventilation system is in heat exchange contact with at least part of the fluid system and the ventilation system comprises:
    an inlet channel arranged in the housing configured for inletting air into the room and an outlet channel arranged in the housing configured for outletting air from the room;
    a heat exchanger configured for exchanging heat between air flowing through the inlet channel and air flowing through the outlet channel;
    a first fan and a second fan arranged in the inlet channel and the outlet channel, respectively, downstream of the heat exchanger, for providing a controllable volumetric airflow through the inlet and outlet channels;
    a bypass mechanism for allowing air flowing through the inlet channel to bypass the heat exchanger; and
    a recirculation mechanism for allowing indoor air and/or outdoor air to be re-circulated through the decentralized system;
wherein the fluid system comprises:
    a first condenser/evaporator,
    a second condenser/evaporator,
    the suspended compressor,
    an expansion valve,
    fluid lines fluidly connecting the first condenser/evaporator with the compressor and the expansion valve and fluidly connecting the second condenser/evaporator with the compressor and the expansion valve to form a closed fluid system,
    a fluid flowing in the closed fluid system when in use, and
    a four-way valve connected to the fluid lines, configured for changing the flow of fluid in the fluid system, such that the function of the first condenser/evaporator and the second condenser/evaporator can be exchanged.

5. A decentralized system according to claim 4, wherein the system further comprises a serial condensate collection system for collecting condensate in the decentralized system, the serial collection system comprising:
    condensate collectors located beneath each of the first and second condensers/evaporators and on each side of the heat exchanger, whereby at least four condensate collectors are located in the decentralised system,
    level control sensors for measuring a level of condensate in the condensate collectors,
    condensate removal fluid lines connecting each condensate collector individually to a central fluid line, wherein each condensate collector has an individually controllable valve for allowing condensate to flow to the central fluid line from the condensate collectors through the condensate removal fluid lines,
    wherein the central fluid line is connected to a pump for the removal of the condensate and an outlet for removing the condensate.

6. A decentralized system according to claim 5, wherein the level control sensors are connected to a control for condensate, CTC, system, the CTC is adapted to send out an external alarm signal when levels in the condensate collectors reach pre-determined thresholds and to control the position of the valves.

7. A method for controlling the removal of condensate in the decentralized system according to claim 5, the method comprising:
    monitoring the condensate level in the condensate collectors by use of the level control sensors,
    determining when the condensate level in the condensate collectors exceeds predefined thresholds,
    opening the valves of the condensate collectors when the condensate level exceeds the predefined thresholds, while keeping the valves of the non-active condensate collectors in a closed position,
    pumping the condensate out of the condensate collectors using the pump.

8. A decentralized system according to claim 4, wherein the bypass mechanism comprises:
    a bypass passage arranged in the housing configured for fluidly connecting the inlet channel upstream of the heat exchanger with the inlet channel downstream of the heat exchanger,
    a bypass door having a first and a second configuration, wherein
        in the first configuration, the bypass door is arranged such that it blocks the bypass passage and allows air to flow through the heat exchanger; and
        in the second configuration, the bypass door is arranged such that it blocks the inlet channel upstream of the heat exchanger and allows air to flow through the bypass passage, and
wherein the recirculation mechanism comprises:
    an indoor air recirculation mechanism comprising
        an indoor air recirculation passage arranged in the housing configured for fluidly connecting the outlet channel upstream of the heat exchanger with the inlet channel downstream of the heat exchanger,
        a first recirculation door having a first and a second configuration, wherein
            in the first configuration, the first recirculation door is arranged such that it blocks the indoor air recirculation passage and allows air to flow through the outlet channel;
            in the second configuration, the first recirculation door is arranged such that is it blocks the outlet channel upstream of the heat exchanger and allows air to flow through the indoor air recirculation passage, such that indoor air is recirculated through the decentralized system; and an outdoor air recirculation mechanism comprising
an indoor air recirculation passage arranged in the housing configured for fluidly connecting the inlet channel upstream of the heat exchanger with the outlet channel downstream of the heat exchanger;
a second recirculation door having a first and a second configuration, wherein
in the first configuration, the second recirculation door is arranged such that it blocks the indoor air recirculation passage and allows air to flow through the inlet channel; and
in the second configuration, the second recirculation door is arranged such that is it blocks the inlet channel upstream of the heat exchanger and allows air to flow through the indoor air recirculation passage, such that outdoor air is recirculated through the decentralized system.

9. A decentralized system according to claim 4, wherein the decentralized system further comprises a first service door and/or a second service door each having a first and a second configuration, wherein
in a first configuration, the first and second service doors are closed, and
in a second configuration,
the first service door is arranged such that it provides an opening in the housing allowing air to flow through the opening and into the outlet channel downstream of the heat exchanger; and
the second service door is arranged such that it provides an opening in the housing allowing air in the inlet channel to flow out of the housing upstream of the heat exchanger.

10. A decentralized system according to claim 9, wherein a control system is configured to operate the decentralized system by controlling:
the state of a bypass door;
the state of the recirculation mechanism;
the state and discharge rate of the first fan and the second fan;
the state and discharge rate of the compressor;
the state of the four-way valve;
the state of the first and second service doors;
whereby the decentralized system can be operated in a plurality of modes and wherein the control system further comprises at least one control unit and one or more sensors configured for providing input signals to the control unit, such that the control system can regulate the decentralized system by changing between the plurality of modes of operation dependent on sensor inputs, to provide a predetermined optimized environment in the room with minimal energy usage.

11. A decentralized system according to claim 1, wherein the compressor comprises three or more attachment members, the attachment members being attached to a corresponding one of the three or more springs.

12. A decentralized system according to claim 11, wherein the attachment members are attached evenly and equidistant around the compressor to evenly distribute the forces acting on the compressor's center of gravity to the three or more springs.

13. A decentralized system according to claim 1, wherein the compressor is suspended by three or more springs within the housing in a substantially vertical orientation.

14. A decentralized system for providing an optimized environment in a room, the system comprising:
a balanced ventilation system configured to extract air from the room and exhaust the air to an external environment, but also to draw replacement air into the room, thus maintaining air pressure within the room, and
a fluid system, the fluid system being a heat pump configured for transferring heat in the balanced ventilation system, wherein:
the balanced ventilation system and the fluid system are both arranged in a housing,
the fluid system comprises a suspended compressor enclosed in the housing,
the compressor is suspended by three or more springs within the housing, the springs being adapted to absorb vertical vibrations from the compressor, wherein the suspended compressor is further located within a sound and air tight casing, the springs are attached to a ceiling of the sound and air tight casing, and the casing includes openings for fluid lines stemming from the compressor,
wherein the fluid lines stemming from the compressor are flexible tubes with no mechanical contact to the sound and airtight casing to ensure that no vibrations from the compressor is transferred to the housing, and
the springs are attached to the compressor at a horizontal plane at the compressor's center of gravity or less than 20% of the compressor's length above or below the compressor's center of gravity.

15. A decentralized system according to claim 14, wherein the springs are vertical components having a vertical position.

16. A decentralized system according to claim 14, wherein the springs are attached to the compressor evenly distributed horizontally around the compressor's center of gravity to evenly distribute the vertical forces at the compressor's center of gravity to the springs.

* * * * *